United States Patent
Hara et al.

(10) Patent No.: US 11,592,023 B2
(45) Date of Patent: Feb. 28, 2023

(54) COMPRESSOR INSTALLATION STRUCTURE FOR VEHICLE

(71) Applicant: TOYOTA JIDOSHA KABUSHIKI KAISHA, Aichi-ken (JP)

(72) Inventors: Yasuhiro Hara, Nagoya (JP); Jumpei Watanabe, Nagakute (JP); Norimasa Koreishi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/498,748

(22) Filed: Oct. 12, 2021

(65) Prior Publication Data

US 2022/0120276 A1    Apr. 21, 2022

(30) Foreign Application Priority Data

Oct. 16, 2020 (JP) .............................. JP2020-174965

(51) Int. Cl.
*F04C 18/02* (2006.01)
*F04C 23/00* (2006.01)

(52) U.S. Cl.
CPC ........ *F04C 18/0215* (2013.01); *F04C 23/001* (2013.01); *F04C 2230/605* (2013.01); *F04C 2270/12* (2013.01)

(58) Field of Classification Search
CPC ...... F04C 23/00; F04C 23/001; F04C 23/003; F04C 11/00; F04C 11/001; F04C 11/003; F04C 18/02–0292; F04C 2/02; F04C 2/025; F04C 2/04; F04C 2/045; F04C 2/06; F04C 2230/604; F04C 2230/605; F04C 29/00; F04C 29/0021; F04C 29/06; F04C 2270/12; F04C 2270/125;
(Continued)

(56) References Cited

U.S. PATENT DOCUMENTS 5,624,247 A  *  4/1997  Nakamura .......... F04C 18/0215
                                                418/60
2013/0251557 A1* 9/2013  Ota ....................... F01C 21/007
                                                417/410.1
(Continued)

FOREIGN PATENT DOCUMENTS

CN    104728105 A  *  6/2015
JP    202029134 A     2/2020
JP    202175089 A     5/2021

*Primary Examiner* — Mark A Laurenzi
*Assistant Examiner* — Xiaoting Hu
(74) *Attorney, Agent, or Firm* — Hauptman Ham, LLP (57) ABSTRACT

A compressor installation structure for a vehicle has: a first compressor that is installed in a vehicle and that is driven by a first displacement body repeating a first movement at a predetermined cycle; and a second compressor that is installed in the vehicle and that is driven by a second displacement body repeating a second movement at the predetermined cycle, wherein, in a state in which the first compressor and the second compressor are installed in the vehicle, a first displacement direction of a first centroid of the first displacement body at a time at which the first displacement body performs the first movement is an opposite direction from a second displacement direction of a second centroid of the second displacement body at a time at which the second displacement body performs the second movement.

4 Claims, 8 Drawing Sheets

(58) Field of Classification Search
CPC ............ F04C 18/00–565; F04C 23/005; F04C 23/006; F04C 23/008; F04C 23/02; B60H 1/3204; B60H 1/3223; B60H 1/3229; B60H 1/323; B60R 11/00; B60S 1/62
See application file for complete search history.

(56) References Cited

U.S. PATENT DOCUMENTS

| | | |
|---|---|---|
| 2020/0062133 A1 | 2/2020 | Tsuruta et al. |
| 2021/0129916 A1 | 5/2021 | Watanabe et al. |

\* cited by examiner

COMPRESSOR INSTALLATION STRUCTURE FOR VEHICLE

CROSS-REFERENCE TO RELATED APPLICATION

This application is based on and claims priority under 35 USC 119 from Japanese Patent Application No. 2020-174965 filed on Oct. 16, 2020, the disclosure of which is incorporated by reference herein.

BACKGROUND

Technical Field

The present disclosure relates to a compressor installation structure for a vehicle.

Related Art

An disclosure relating to an electric automobile is disclosed in Japanese Patent Application Laid-Open (JP-A) No. 2020-29134. In this electric automobile, sensors that acquire the situation at the periphery of the vehicle are washed by a washing unit. In detail, the washing unit has a liquid pipe that supplies washing liquid toward the sensor, and an air pipe that supplies compressed air. The washing unit can clean the sensor by the washing liquid and the compressed air.

By the way, in JP-A No. 2020-29134, because the washing unit cleans the sensor by using compressed air, a compressor that supplies compressed air to the washing unit is needed. In addition thereto, a compressor is needed also in order to compress coolant that is used in the air conditioner of the vehicle. Therefore, in JP-A No. 2020-29134, plural compressors must be installed in the vehicle. On the other hand, it is thought that, if plural compressors are installed in a vehicle, the effects that the vibrations of these compressors have on the vehicle become greater.

However, JP-A No. 2020-29134 does not devise countermeasures to vibrations of plural compressors, and therefore, there is room for improvement from the standpoint of suppressing the effects of vibrations of plural compressors on a vehicle.

SUMMARY

In view of the above-described circumstances, an object of the present disclosure is to provide a compressor installation structure for a vehicle that can suppress effects of vibrations of plural compressors on a vehicle.

A compressor installation structure for a vehicle of a first aspect of the present disclosure has: a first compressor that is installed in a vehicle and that is driven by a first displacement body repeating a first movement at a predetermined cycle; and a second compressor that is installed in the vehicle and that is driven by a second displacement body repeating a second movement at the predetermined cycle, wherein, in a state in which the first compressor and the second compressor are installed in the vehicle, a first displacement direction of a first centroid of the first displacement body at a time at which the first displacement body performs the first movement is an opposite direction from a second displacement direction of a second centroid of the second displacement body at a time at which the second displacement body performs the second movement.

In accordance with the first aspect of the present disclosure, the vehicle has the first compressor and the second compressor, and these compressors can be used for different applications.

By the way, the first compressor is driven due to the first displacement body repeating a first movement at a predetermined cycle, and the second compressor is driven due to the second displacement body repeating a second movement at that cycle. Therefore, it is thought that vibrations that are caused by the first movement of the first displacement body and the second movement of the second displacement body are generated.

Here, in the present disclosure, in the state in which the first compressor and the second compressor are installed in a vehicle, the first displacement direction of the first centroid of the first displacement body at the time when the first displacement body carries out the first movement is set to be the direction opposite the second displacement direction of the second centroid of the second displacement body at the time when the second displacement body carries out the second movement. Therefore, in the present disclosure, the first displacement body and the second displacement body function as counterweights with respect to one another, and vibrations that are caused by the first movement of the first displacement body and vibrations that are caused by the second movement of the second displacement body cancel one another out.

In a compressor installation structure for a vehicle of a second aspect of the present disclosure, in the first aspect, the first compressor and the second compressor are fixed to a same fixing portion, and the fixing portion structures a portion of a frame of the vehicle.

In accordance with the second aspect of the present disclosure, the first compressor and the second compressor are fixed to the same fixed-to portion, and the vibrations that are caused by the first movement of the first displacement body and the vibrations that are caused by the second movement of the second displacement body cancel one another out at this fixed-to portion. Further, because the fixed-to portion structures a portion of the frame of the vehicle, the vibrations that arise at the fixed-to portion are dispersed to the frame.

In a compressor installation structure for a vehicle of a third aspect of the present disclosure, in the second aspect, the first displacement body is rotatable around a first shaft, the second displacement body is rotatable around a second shaft having the same height in a vehicle vertical direction as the first shaft and extending parallel to the first shaft, the fixing portion extends in a vehicle width direction, and the first compressor and the second compressor are disposed at an interval in the vehicle width direction.

In accordance with the third aspect of the present disclosure, the first shaft that is the center of rotation of the first displacement body, and the second shaft that is the center of rotation of the second displacement body, are disposed parallel to one another, and the vehicle vertical direction heights thereof are set to be the same height. Therefore, the space that is needed for placement of the first compressor and the second compressor becoming large in the vehicle vertical direction can be suppressed.

Further, the fixed-to portion, to which the first compressor and the second compressor are fixed, extends in the vehicle width direction, and the first compressor and the second compressor are disposed with an interval therebetween in the vehicle width direction. Therefore, in the vehicle width direction, concentrating of vibrations that are caused by the first compressor and the second compressor can be suppressed.

In a compressor installation structure for a vehicle of a fourth aspect of the present disclosure, in the third aspect, the fixing portion is a cross portion that extends between a pair of side frame portions that structure portions of the frame, which supports a vehicle body from a vehicle lower side, that are disposed at an interval in the vehicle width direction, and that extend in a vehicle front-rear direction.

In accordance with the fourth aspect of the present disclosure, the vehicle body is supported from the vehicle lower side by the frame. This frame has a pair of side frame portions that are disposed with an interval therebetween in the vehicle width direction and that extend in the vehicle front-rear direction, and a cross portion that spans between the pair of side frame portions. Further, the first compressor and the second compressor are fixed to the cross portion. Therefore, vibrations that are caused by the first compressor and the second compressor are dispersed to the frame, and these vibrations being transmitted to the vehicle body side can be suppressed.

In a compressor installation structure for a vehicle of a fifth aspect of the present disclosure, in any one of the second through fourth aspects, the first compressor is mounted at the fixing portion via a first mounting portion that has a first damping portion that is configured to damp relative vibration between the first compressor and the fixing portion, and the second compressor is mounted to the fixing portion via a second mounting portion that has a second damping portion that is configured to damp relative vibration between the second compressor and the fixing portion.

In accordance with the fifth aspect of the present disclosure, the first compressor is mounted to the fixed-to portion via the first mounting portion that has the first damping portion, and relative vibrations between the first compressor and the fixed-to portion are damped by the first damping portion. Further, the second compressor is mounted to the fixed-to portion via the second mounting portion that has the second damping portion, and relative vibrations between the second compressor and the fixed-to portion are damped by the second damping portion.

As described above, the compressor installation structure for a vehicle of the first aspect of the present disclosure has the excellent effect of being able to suppress the effects of vibrations of plural compressors on a vehicle.

The compressor installation structure for a vehicle of the second aspect of the present disclosure has the excellent effect of being able to suppress the generation of vibrations, which are caused by plural compressors, at a vehicle.

The compressor installation structure for a vehicle of the third aspect of the present disclosure has the excellent effect of being able to suppress a concentration of vibrations that are caused by plural compressors, while ensuring the space that is needed for placement of these compressors.

The compressor installation structure for a vehicle of the fourth aspect of the present disclosure has the excellent effect of being able to suppress the transmission of vibrations, which are caused by plural compressors, to passengers who are riding in the vehicle body.

The compressor installation structure for a vehicle of the fifth aspect of the present disclosure has the excellent effect of being able to absorb vibrations that are generated from plural compressors.

BRIEF DESCRIPTION OF THE DRAWINGS

Exemplary embodiments of the present disclosure will be described in detail based on the following figures, wherein.

DETAILED DESCRIPTION

A compressor installation structure for a vehicle relating to a first embodiment of the present disclosure is described hereinafter by using FIG. 1 through FIG. 6. Note that arrow FR that is shown appropriately in the respective drawings indicates the vehicle front side, arrow UP indicates the vehicle upper side, and arrow RH indicates the vehicle width direction right side.

Figure 1:
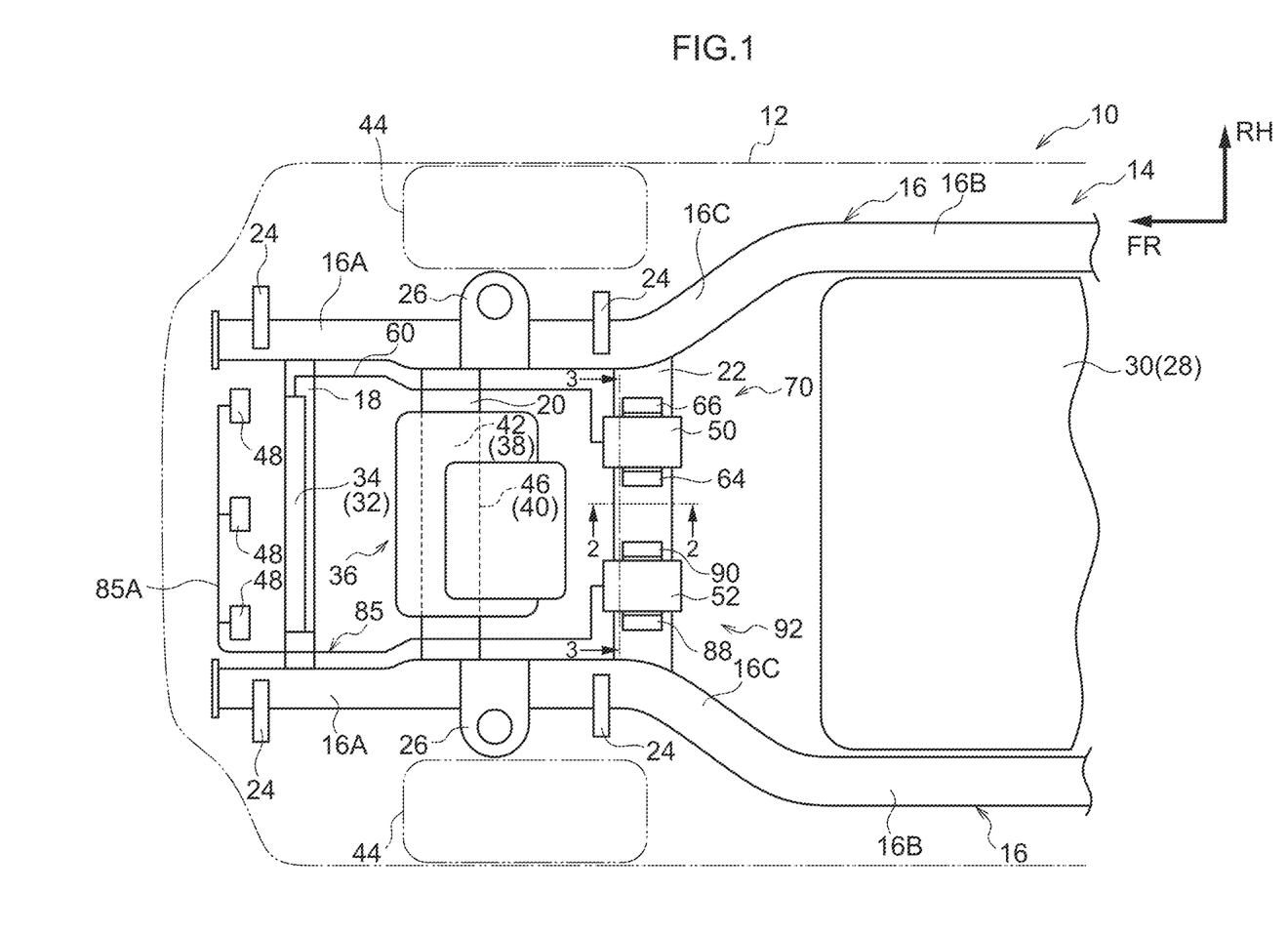
FIG. 1 is a plan view that schematically shows the structure of a vehicle to which a compressor installation structure for a vehicle relating to a first embodiment is applied.

As shown in FIG. 1, a "vehicle 10" to which the compressor installation structure for a vehicle relating to the present embodiment is applied has a "vehicle body 12" that is made of steel and a "frame 14" that is made of steel and supports the vehicle body 12, and has a so-called frame structure.

The vehicle body 12 is the shape of a box whose outer shape is a substantially rectangular parallelopiped that extends in the vehicle front-rear direction, and the vehicle body 12 structures the main portion of a vehicle cabin in which passengers ride. Note that the vehicle body 12 and the frame 14 are structures that are basically symmetrical in the vehicle width direction and the vehicle front-rear direction.

The vehicle body 12 is structured to include an unillustrated roof portion that structures the portion at the vehicle upper side of the vehicle body 12, an unillustrated floor portion that structures the portion at the vehicle lower side of the vehicle body 12, and four pillar portions that are not illustrated and that connect the roof portion and the floor portion in the vehicle vertical direction.

On the other hand, the frame 14 has a pair of "side frame portions 16" that are disposed with an interval therebetween in the vehicle width direction, and a first cross portion 18, a second cross portion 20, and a "third cross portion 22" that serves as a fixed-to portion. These cross portions 18, 20, 22 span between the side frame portions 16.

The side frame portion 16 extends overall in the vehicle front-rear direction, and is structured to include a front frame portion 16A, a main frame portion 16B and a kick portion 16C, and is a closed cross-sectional structure whose cross-section, as seen from the vehicle front-rear direction, is a closed cross-section.

In further detail, the front frame portions 16A structure the vehicle front side portions of the side frame portions 16, and extend rectilinearly in the vehicle front-rear direction. A pair of mounting portions 24 that support the vehicle body 12 are provided at the front frame portions 16A. Suspension towers 26 are provided at the front frame portions 16A, between the mounting portions 24. Unillustrated shock absorbers and the like are mounted to the suspension towers 26.

The main frame portions 16B structure the vehicle front-rear direction central portions of the side frame portions 16, and are disposed at the vehicle width direction outer sides and vehicle lower sides of the front frame portions 16A, and extend rectilinearly in the vehicle front-rear direction.

A battery pack 28, which can supply electric power to a power unit 36 that is described later, is disposed between the main frame portions 16B. The battery pack 28 is structured to include a battery case 30, which is formed of an aluminum alloy and structures the outer case of the battery pack 28, and unillustrated, plural battery modules that are disposed at the inner side of the battery case 30.

Note that, as seen from the vehicle width direction, the battery pack 28 is disposed such that the main portion thereof fits between the upper surfaces and the lower surfaces of the main frame portions 16B. Further, the battery pack 28 is mounted by unillustrated fastening members to the lower surfaces of the main frame portions 16B.

The kick portions 16C are interposed between the front frame portions 16A and the main frame portions 16B. As seen from the vehicle vertical direction, the kick portions 16C extend-out from the front frame portions 16A toward the vehicle rear side and the vehicle width direction outer sides, and, as seen from the vehicle width direction, the kick portions 16C extend-out from the front frame portions 16A toward the vehicle rear side and the vehicle lower side.

The first cross portion 18 extends in the vehicle width direction, and, at the vehicle lower sides of the mounting portions 24 that are at the vehicle front side, connects the front frame portions 16A together in the vehicle width direction. Further, the first cross portion 18 is supported from the vehicle lower side by a condenser 34 that structures a portion of an air conditioner 32 that is installed in the vehicle 10. This condenser 34 can condense a coolant, which has been compressed by a "compressor 50 for air conditioning" that serves as a first compressor and is described later, by heat exchange with air.

The second cross portion 20 extends in the vehicle width direction, and, at the vehicle lower sides of the suspension towers 26, connects the front frame portions 16A together in the vehicle width direction. Further, plural motor mounting portions that are not illustrated are provided at the second cross portion 20. A motor 38 that structures a portion of the power unit 36 is mounted to these motor mounting portions, and the motor 38 is in a state of being supported from the vehicle lower side by the second cross portion 20.

The third cross portion 22 extends in the vehicle width direction, and, at the border portions of the front frame portions 16A with the kick portions 16C, connects the front frame portions 16A in the vehicle width direction.

The structure of the power unit 36 is described next. The power unit 36 is structured to include the motor 38 and an electric power supplying section 40. The power unit 36 is disposed between the side frame portions 16, between the first cross portion 18 and the third cross portion 22.

The motor 38 has a housing 42 that structures the outer case thereof. A motor main body portion, a counter gear mechanism and a differential gear mechanism, none of which are illustrated, are disposed at the inner side of the housing 42. The motor main body portion is driven due to electric power being supplied thereto. The driving force of the motor main body portion is transmitted via the counter gear mechanism and the differential gear mechanism to an unillustrated pair of driving shafts, and drives driving wheels 44 (front wheels).

On the other hand, the electric power supplying section 40 is disposed at the vehicle upper side of the motor 38. This electric power supplying section 40 is structured to include a housing 46 that is the shape of a box whose outer shape is substantially rectangular parallelopiped, and plural, unillustrated electronic devices that are built-in the inner side of the housing 46.

In detail, a high-voltage junction box, a DC charging relay, an AC charger, a DC/DC inverter, and the like are disposed at the inner side of the housing 46. The electric power supplying section 40 is electrically connected, via unillustrated wire harnesses, to the battery pack 28, the motor 38, the compressor 50 for air conditioning that is described later, and a "compressor 52 for cleaning" that serves as the second compressor. Electric power is supplied from the battery pack 28 via the electric power supplying section 40 to the motor 38, the compressor 50 for air conditioning, and the compressor 52 for cleaning. Note that the electric power supplying section 40 is mounted to the frame 14 via unillustrated mounting members.

An unillustrated autonomous driving ECU (Electronic Control Unit), which can carry out autonomous driving of the vehicle 10 by controlling the power unit 36 and the like, is installed in the vehicle 10. Further, plural sensors 48 which can acquire the situation at the periphery of the vehicle 10, are disposed at the vehicle body 12 at the portion that is at the vehicle front side of the condenser 34 and the portion that is at the vehicle front side of the roof portion. These sensors 48 can communicate with the autonomous driving ECU.

On the basis of signals that are transmitted from these sensors 48, the autonomous driving ECU can judge the situation at the periphery of the vehicle 10, i.e., the absence/presence of objects near the vehicle 10, and the like. Note that a camera that captures images of a predetermined range, millimeter wave radar that transmits search signals over a predetermined range, LIDAR (Light Detection and Ranging/Laser Imaging Detection and Ranging) that senses a predetermined range, and the like are examples of the sensors 48. Note that the sensors 48 are disposed also at the vehicle rear side portion of the vehicle body 12.

An unillustrated washing unit, which can wash unillustrated detection surfaces of the sensors 48, is installed in the vehicle 10. This washing unit can jet-out pressurized washing liquid onto the detection surfaces of the sensors 48. Note that the washing unit is driven on the basis of control signals from the autonomous driving ECU or control signals given by operation of an operation portion by a driver.

The washing liquid that remains on the detection surface after washing of the detection surface of the sensor 48 is removed from the detection surface by compressed air that is supplied from the compressor 52 for cleaning.

Here, in the present embodiment, the compressor installation structure for a vehicle relating to the present embodiment is applied to the compressor 50 for air conditioning and the compressor 52 for cleaning. The compressor 50 for air conditioning, the compressor 52 for cleaning, and peripheral structures of the compressor 50 for air conditioning and the compressor 52 for cleaning are described in detail hereinafter.

Figure 2:
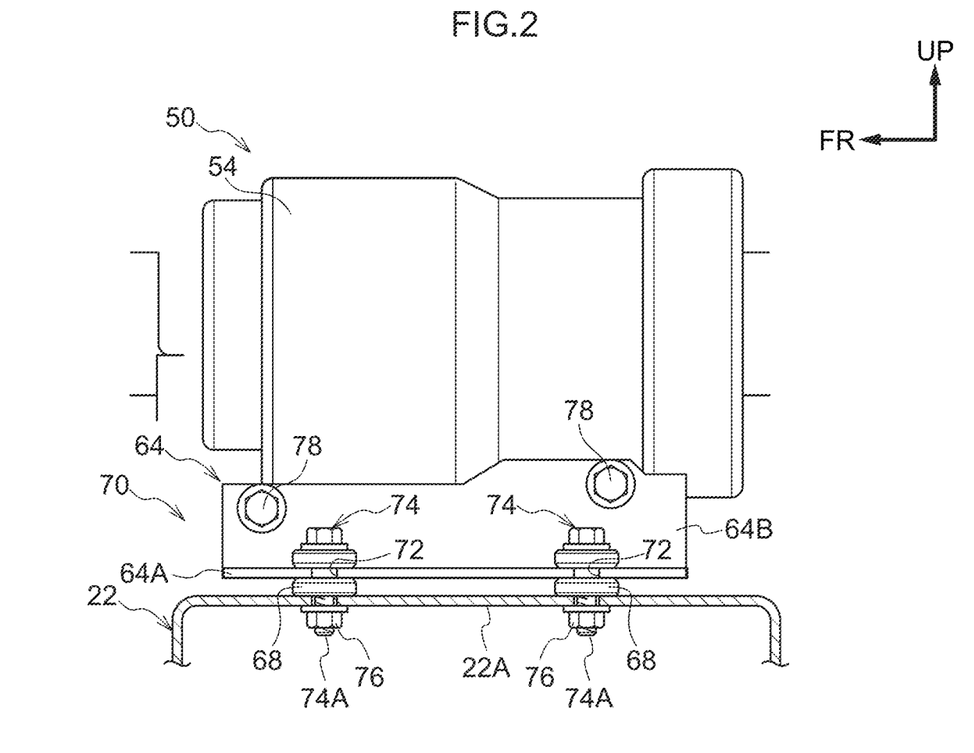
FIG. 2 is a cross-sectional view that is seen from a vehicle width direction and schematically shows structures at the periphery of a compressor at the vehicle to which is applied the compressor installation structure for a vehicle relating to the first embodiment (a cross-sectional view showing the state cut along line 2-2 of FIG. 1)
Figure 3:
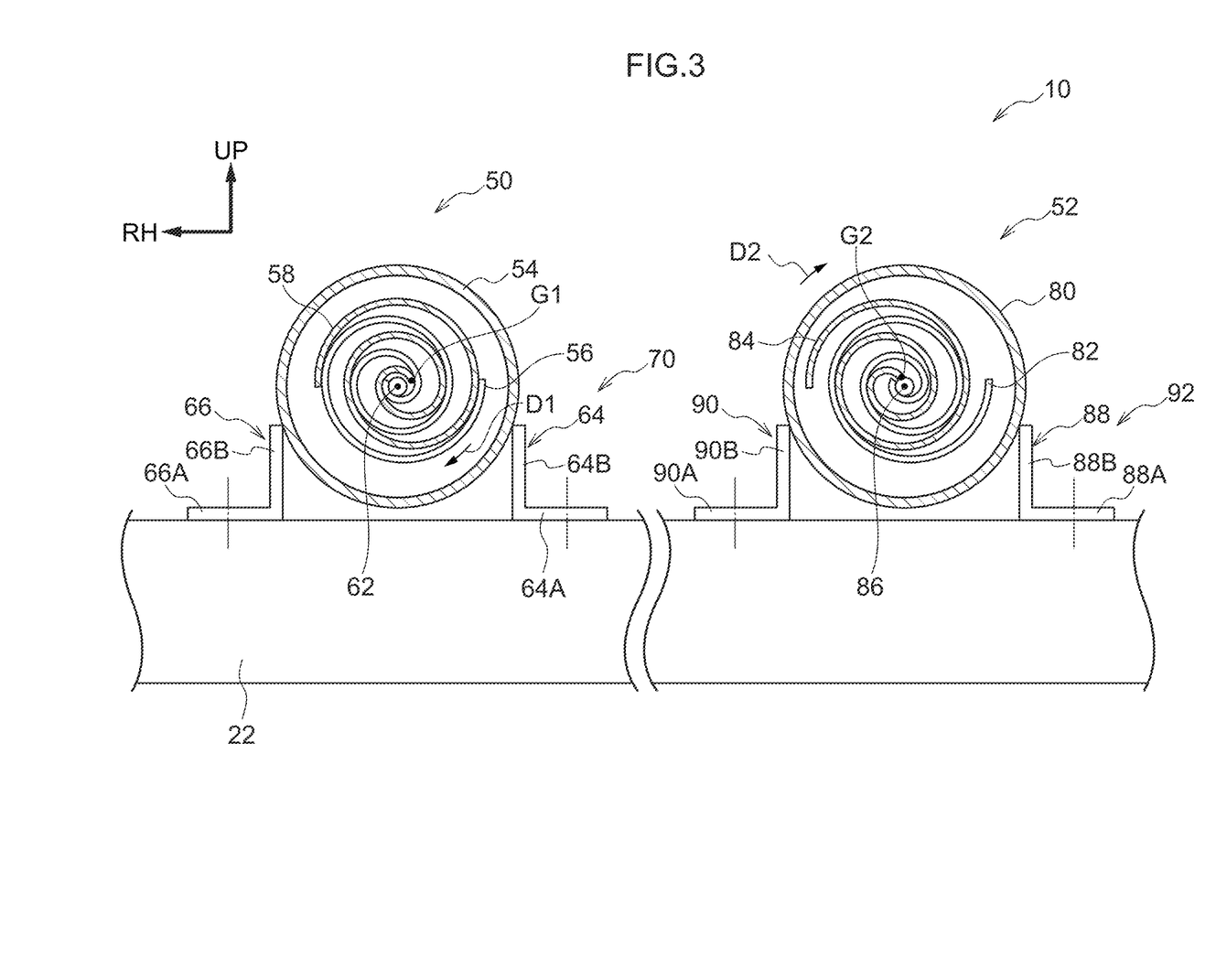
FIG. 3 is a cross-sectional view that is seen from a vehicle front-rear direction and schematically shows the structures of the compressors at the vehicle to which is applied the compressor installation structure for a vehicle relating to the first embodiment (a cross-sectional view showing the state cut along line 3-3 of FIG. 1)

As shown in FIG. 1 through FIG. 3, the outer shape of the compressor 50 for air conditioning is the shape of a cylinder whose length direction is the vehicle front-rear direction. The compressor 50 for air conditioning is a scroll compressor, and is structured to include a housing 54 that structures the outer case thereof, a fixed scroll 56 that is provided integrally with the housing 54, and a "movable scroll 58" that serves as a first displacement body. A tube portion 60 for air conditioning is connected to the compressor 50 for air conditioning.

Further, due to the movable scroll 58 rotating around a "first shaft 62", which extends in the vehicle front-rear direction, with respect to the fixed scroll 56, the compressor 50 for air conditioning can compress coolant that is sent from an unillustrated evaporator. The coolant that is compressed at the compressor 50 for air conditioning is sent via the tube portion 60 for air conditioning to the condenser 34.

The compressor 50 for air conditioning is disposed at the vehicle width direction right side with respect to the vehicle width direction center of the vehicle 10, and, as seen from the vehicle vertical direction, is disposed between the power unit 36 and the battery pack 28. The compressor 50 for air conditioning is fixed to the third cross portion 22 of the frame 14 via a "first mounting portion 70" that is structured to include a supporting member 64, a supporting member 66, and plural "rubber bushes 68" that serve as a first damping portion.

The supporting member 64 is disposed at the vehicle width direction left side of the compressor 50 for air conditioning, and is structured by a plate member that is made of steel being bent. This supporting member 64 is structured to include a lower wall portion 64A whose plate thickness direction is the vehicle vertical direction and that extends in the vehicle front-rear direction, and a vertical wall portion 64B that extends-out toward the vehicle upper side from the peripheral edge portion at the vehicle width direction right side of the lower wall portion 64A and that extends in the vehicle front-rear direction.

In detail, a pair of slit portions 72 are provided in the lower wall portion 64A with an interval therebetween in the vehicle front-rear direction. The slit portions 72 are formed in the lower wall portion 64A along the vehicle width direction, and the vehicle width direction left sides thereof are open. The rubber bushes 68 are respectively fit into these slit portions 72. Unillustrated through portions that pass through in the vehicle vertical direction are formed in the rubber bushes 68. Further, shaft portions 74A of bolts 74 are inserted through the rubber bushes 68 from the vehicle upper side, and the shaft portions 74A are fastened to weld nuts 76 that are provided at the lower surface of an upper wall portion 22A of the third cross portion 22. The supporting member 64 is thereby fixed to the third cross portion 22.

On the other hand, a pair of unillustrated through portions are provided at the vertical wall portion 64B with an interval therebetween in the vehicle front-rear direction. Unillustrated shaft portions of bolts 78 are inserted-through from the vehicle width direction left sides of these through portions, and these shaft portions are fastened to unillustrated female screw portions that are provided at the housing 54 of the compressor 50 for air conditioning. Due thereto, the vertical wall portion 64B is fixed to the compressor 50 for air conditioning.

The supporting member 66 is disposed at the vehicle width direction right side of the compressor 50 for air conditioning, and is structured so as to have mirror symmetry with respect to the supporting member 64 as seen from the vehicle front-rear direction. A lower wall portion 66A of this supporting member 66 is fixed to the third cross portion 22 via the rubber bushes 68 and the bolts 74, and a vertical wall portion 66B thereof is fixed to the compressor 50 for air conditioning via the bolts 78.

The tube portion 60 for air conditioning is structured by a tube member that is made of metal. One end portion thereof is connected to the compressor 50 for air conditioning, and the other end portion thereof is connected to the condenser 34. This tube portion 60 for air conditioning is disposed along the vehicle width direction inner side surface of the side frame portion 16 that is at the vehicle width direction right side, and is fixed by unillustrated mounting members to plural places of this side frame portion 16.

On the other hand, the compressor 52 for cleaning is basically structured similarly to the compressor 50 for air conditioning, and is structured to include a housing 80, a fixed scroll 82, and a "movable scroll 84" that serves as a second displacement body. A tube portion 85 for cleaning is connected to the compressor 52 for cleaning.

Further, due to the movable scroll 84 rotating around a "second shaft 86", which extends in the vehicle front-rear direction, with respect to the fixed scroll 82, the compressor 52 for cleaning can send compressed air to the tube portion 85 for cleaning. Note that the vehicle vertical direction height of the first shaft 62 and the vehicle vertical direction height of the second shaft 86 are set to be the same height.

The compressor 52 for cleaning is disposed at the vehicle width direction left side with respect to the vehicle width direction center of the vehicle 10, and, as seen from the vehicle vertical direction, is disposed between the power unit 36 and the battery pack 28. The compressor 52 for cleaning is fixed to the third cross portion 22 of the frame 14 via a "second mounting portion 92" that is structured to include a supporting member 88, a supporting member 90, and the plural rubber bushes 68. Note that, at the second mounting portion 92, the rubber bushes 68 function as a second damping portion.

The supporting member 88 is disposed at the vehicle width direction left side of the compressor 52 for cleaning, and includes a lower wall portion 88A and a vertical wall portion 88B, and is structured similarly to the supporting member 64. In the same way as the lower wall portion 64A of the supporting member 64, the lower wall portion 88A is fixed to the third cross portion 22 via the rubber bushes 68 and the bolts 74. On the other hand, in the same way as the vertical wall portion 64B of the supporting member 64, the vertical wall portion 88B is fixed to the compressor 52 for cleaning via the bolts 78.

On the other hand, the supporting member 90 is disposed at the vehicle width direction right side of the compressor 52 for cleaning, and includes a lower wall portion 90A and a vertical wall portion 90B, and is structured similarly to the supporting member 66. The lower wall portion 90A of the supporting member 90 is fixed to the third cross portion 22 via the rubber bushes 68 and the bolts 74, and the vertical wall portion 90B is fixed to the compressor 52 for cleaning via the bolts 78.

On the other hand, the tube portion 85 for cleaning is structured by a tube member that is made of metal. One end portion thereof is connected to the compressor 52 for cleaning. At a place at which the tube portion 85 for cleaning extends-out by a predetermined length from the compressor 52 for cleaning, the tube portion 85 for cleaning is bifurcated into a first tube portion 85A and an unillustrated second tube portion.

The main portion of the first tube portion 85A is disposed along the vehicle width direction inner side surface of the side frame portion 16 that is at the vehicle width direction left side. The vehicle front side portion of the first tube portion 85A extends in the vehicle width direction. Further, at the vehicle front side, the first tube portion 85A forks-off at plural places, and the end portions of these portions open toward the detection surfaces of the sensors 48.

The second tube portion of the tube portion 85 for cleaning passes-through the interior of a pillar portion of the vehicle body 12, and extends-out toward the vehicle upper side. At the upper end portion of this pillar portion, the second tube portion is bent toward the vehicle front side, and is disposed along a roof side rail of the roof portion. Then, at the vehicle front side, the second tube portion extends in the vehicle width direction, and is forked-off at plural places. The end portions of these portions open toward the detection surfaces of the sensors 48 that are disposed at the vehicle front side of the roof portion.

Figure 4:
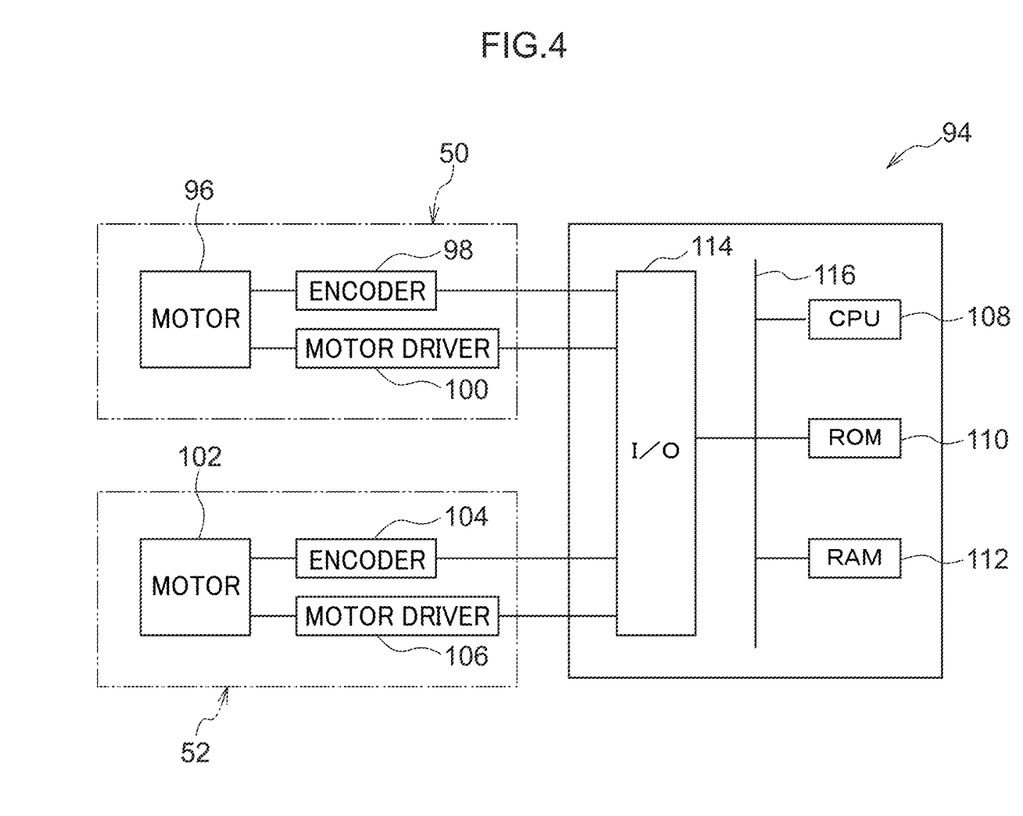
FIG. 4 is a block drawing showing hardware structures of the vehicle to which is applied the compressor installation structure for a vehicle relating to the first embodiment.

Further, in the present embodiment, as shown in FIG. 4, the driving of the compressor 50 for air conditioning and the compressor 52 for cleaning can be controlled by a control device 94.

In detail, a motor 96 that rotates the movable scroll 58, an encoder 98 that can output signals that are based on the rotational speed and the rotation angle of the motor 96, and a motor driver 100 that can control the motor 96 on the basis of inputted signals, are disposed at the inner side of the housing 54 of the compressor 50 for air conditioning.

On the other hand, a motor 102 that rotates the movable scroll 84, an encoder 104 that can output signals that are based on the rotational speed and the rotation angle of the motor 102, and a motor driver 106 that can control the motor 102 on the basis of inputted signals, are disposed at the inner side of the housing 80 of the compressor 52 for cleaning.

The control device 94 is structured to include a CPU (Central Processing Unit) 108 that is an example of a processor that is hardware, a ROM (Read Only Memory) 110, a RAM (Random Access Memory) 112, and an input/output interface 114 (hereinafter called I/O 114). The CPU 108, the ROM 110, the RAM 112 and the I/O 114 are connected to one another via a bus 116. Note that the control device 94 may be equipped with a non-volatile memory such as an HDD (Hard Disk Drive) or an SSD (Solid State Drive) or the like.

The CPU 108 is a central computing processing unit, and can execute various programs relating to various types of control of the compressor 50 for air conditioning and the compressor 52 for cleaning. Concretely, the CPU 108 reads-out a program from the ROM 110, and can execute the program by using the RAM 112 as a workspace. Further, the control device 94 can exhibit various functions as will be described later, due to an execution program that is stored in the ROM 110 being read-out and executed by the CPU 108.

The I/O 114 is an interface for enabling the control device 94 to communicate with respective devices that are installed in the vehicle 10. The encoder 98, the encoder 104, the motor driver 100 and the motor driver 106 are connected to the I/O 114 so as to be able to communicate with one another.

Figure 5:
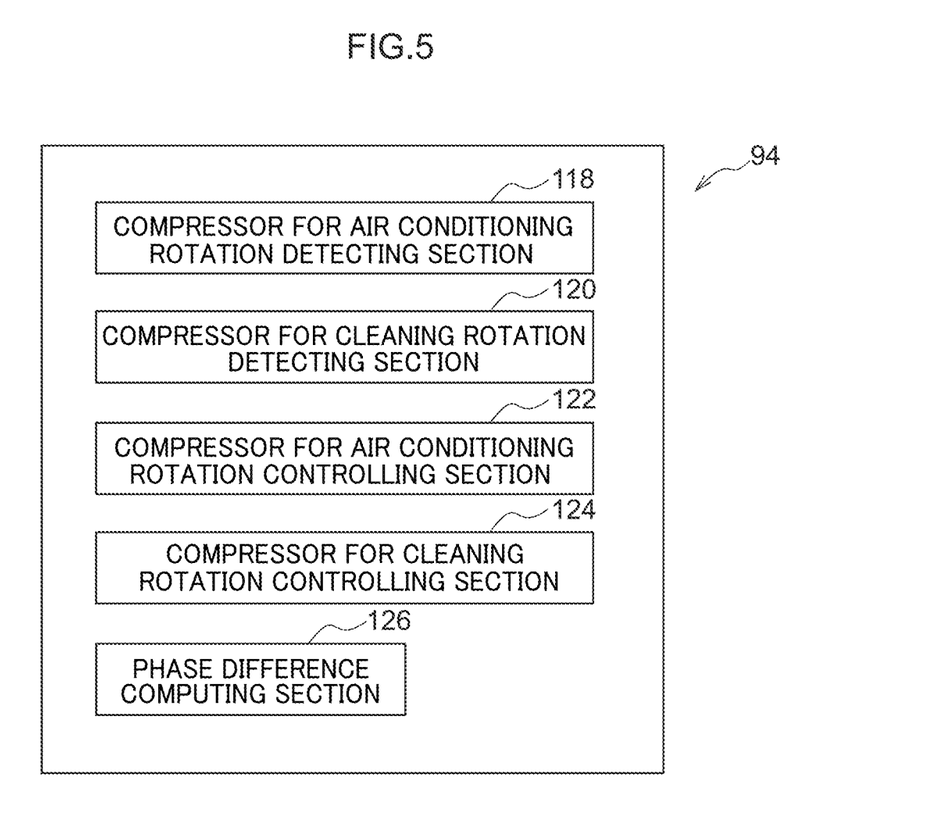
FIG. 5 is a block drawing showing functional structures of the vehicle to which is applied the compressor installation structure for a vehicle relating to the first embodiment.

The functional structures of the control device 94 are described next by using FIG. 5. Due to the CPU 108 reading-out the execution program that is stored in the ROM 110 and executing the execution program, the control device 94 functions as the set of a compressor for air conditioning rotation detecting section 118, a compressor for cleaning rotation detecting section 120, a compressor for air conditioning rotation controlling section 122, a compressor for cleaning rotation controlling section 124, and a phase difference computing section 126.

On the basis of a signal inputted from the encoder 98, the compressor for air conditioning rotation detecting section 118 detects the rotational speed and the rotation angle of the motor 96, i.e., the rotational speed and the rotation angle of the movable scroll 58, and temporarily stores these values.

On the basis of a signal inputted from the encoder 104, the compressor for cleaning rotation detecting section 120 detects the rotational speed and the rotation angle of the motor 102, i.e., the rotational speed and the rotation angle of the movable scroll 84, and temporarily stores these values.

By inputting a signal to the motor driver 100 and controlling the motor driver 100, the compressor for air conditioning rotation controlling section 122 controls the rotating direction of the motor 96 and the rotational speed of the motor 96.

By inputting a signal to the motor driver 106 and controlling the motor driver 106 on the basis of a signal that is inputted from the phase difference computing section 126 or the like, the compressor for cleaning rotation controlling section 124 controls the rotating direction of the motor 102 and the rotational speed of the motor 102.

The phase difference computing section 126 computes the phase difference between the motor 96 and the motor 102 on the basis of the rotational speed and the rotation angle of the motor 96 that were detected by the compressor for air conditioning rotation detecting section 118, and the rotational speed and the rotation angle of the motor 102 that were detected by the compressor for cleaning rotation detecting section 120. Then, the phase difference computing section 126 outputs a signal, which is based on the phase difference between the motor 96 and the motor 102, to the compressor for cleaning rotation controlling section 124.

Further, in the state in which the compressor 50 for air conditioning and the compressor 52 for cleaning are being driven, the control device 94 that is structured as described above controls the motor 96 and the motor 102 such that the movable scroll 58 and the movable scroll 84 rotate in the same rotating direction and at the same rotational speed. Further, the control device 94 controls the motor 96 and the motor 102 such that the phase difference between the rotation of the movable scroll 58 and the rotation of the movable scroll 84 is 180°.

In other words, in the state in which the movable scroll 58 and the movable scroll 84 are rotationally operating, as shown in FIG. 3, "displacement direction D1" which is the first displacement direction of "centroid G1" which is the first centroid of the movable scroll 58 at a predetermined point in time is set to be the direction opposite "displacement direction D2" which is the second displacement direction of "centroid G2" which is the second centroid of the movable scroll 84 at that predetermined point in time.

Operation and Effects of Present Embodiment

Operation and effects of the present embodiment are described next.

Figure 6:
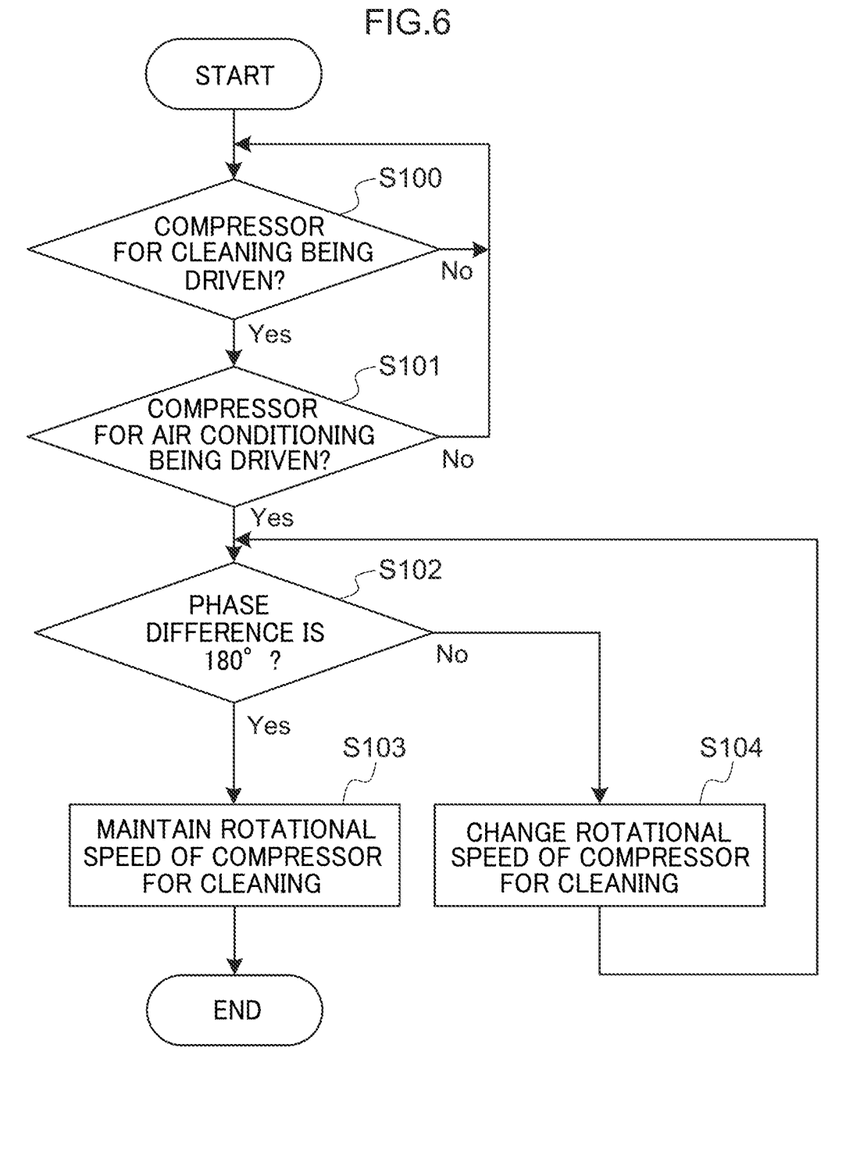
FIG. 6 is a flowchart showing a control flow of the compressor that is installed in the vehicle to which is applied the compressor installation structure for a vehicle relating to the first embodiment.

An example of the flow of control of the compressor 50 for air conditioning and the compressor 52 for cleaning by the control device 94 is described hereinafter by using mainly the flowchart shown in FIG. 6. This control flow is started due to the CPU 108 receiving a predetermined instruction signal.

When this control flow is started, in step S100, on the basis of a signal inputted from the encoder 98, the CPU 108 acquires the driving state of the compressor 52 for cleaning. If driving of the compressor 52 for cleaning is detected (step S100: YES), the CPU 108 moves on to step S101. If driving of the compressor 52 for cleaning is not detected (step S100: NO), the CPU 108 returns to step S100.

In step S101, on the basis of a signal inputted from the encoder 104, the CPU 108 acquires the driving state of the compressor 50 for air conditioning. If driving of the compressor 50 for air conditioning is detected (step S101: YES), the CPU 108 moves on to step S102. If driving of the compressor 50 for air conditioning is not detected (step S101: NO), the CPU 108 returns to step S100.

In step S102, on the basis of signals inputted from the encoder 98 and the encoder 104, the CPU 108 computes the phase difference between the motor 96 and the motor 102. Then, if the phase difference between the motor 96 and the motor 102 is 180° (step S102: YES), the CPU 108 moves on to step S103. If the phase difference between the motor 96 and the motor 102 is not 180° (step S102: NO), the CPU 108 moves on to step S104. Note that, if the phase difference between the motor 96 and the motor 102 is within a predetermined range with respect to 180°, the CPU 108 considers that the phase difference between the motor 96 and the motor 102 is 180°.

In step S103, the CPU 108 controls the motor driver 106, and maintains the rotational speed of the motor 102, i.e., the rotational speed of the compressor 52 for cleaning, constant, and ends the above-described control flow.

In step S104, the CPU 108 controls the motor driver 106, and changes the rotational speed of the motor 102, i.e., the rotational speed of the compressor 52 for cleaning, such that the phase difference between the motor 102 and the motor 96 approaches 180°, and returns to step S102.

Further, in the present embodiment, due to the compressor 50 for air conditioning and the compressor 52 for cleaning being controlled as described above, the displacement direction D1 of the centroid G1 of the movable scroll 58 at the time of rotational movement becomes the direction opposite the displacement direction D2 of the centroid G2 of the movable scroll 84 at the time of rotational movement.

Therefore, in the present embodiment, the movable scroll 58 and the movable scroll 84 function as counterweights with respect to one another, and vibrations, which are caused by rotational movement of the movable scroll 58, and vibrations, which are caused by rotational movement of the movable scroll 84, cancel one another out. Accordingly, in the present embodiment, effects, on the vehicle 10, due to vibrations of plural compressors, i.e., the compressor 50 for air conditioning and the compressor 52 for cleaning, can be suppressed.

Further, in the present embodiment, the compressor 50 for air conditioning and the compressor 52 for cleaning are fixed to the third cross portion 22 of the frame 14. The vibrations, which are caused by rotational movement of the movable scroll 58 of the compressor 50 for air conditioning, and the vibrations, which are caused by rotational movement of the movable scroll 84 of the compressor 52 for cleaning, cancel one another out at the third cross portion 22. Further, because the third cross portion 22 structures a portion of the frame of the vehicle 10, vibrations that arise at the third cross portion 22 are dispersed to this frame. Accordingly, in the present embodiment, vibrations, which are caused by plural compressors, being generated at the vehicle 10 can be suppressed.

Further, in the present embodiment, the first shaft 62 that is the rotational center of the movable scroll 58, and the second shaft 86 that is the rotational center of the movable scroll 84, are disposed parallel to one another, and the vehicle vertical direction heights thereof are set to be the same height. Therefore, the space needed for placement of the compressor 50 for air conditioning and the compressor 52 for cleaning becoming large in the vehicle vertical direction can be suppressed.

Further, the third cross portion 22, to which the compressor 50 for air conditioning and the compressor 52 for cleaning are fixed, extends in the vehicle width direction, and the compressor 50 for air conditioning and the compressor 52 for cleaning are disposed with an interval therebetween in the vehicle width direction. Therefore, vibrations, which are caused by the compressor 50 for air conditioning and the compressor 52 for cleaning, concentrating in the vehicle width direction can be suppressed. Accordingly, in the present embodiment, a concentration of vibrations that are caused by plural compressors can be suppressed, while the space that is needed for placement of these compressors is ensured.

Further, in the present embodiment, the vehicle body 12 is supported from the vehicle lower side by the frame 14. The frame 14 has the pair of side frame portions 16, which are disposed with an interval therebetween in the vehicle width direction and that extend in the vehicle front-rear direction, and the third cross portion 22 that spans between the pair of side frame portions 16. Further, as described above, the compressor 50 for air conditioning and the compressor 52 for cleaning are fixed to the third cross portion 22. Therefore, the vibrations that are caused by the compressor 50 for air conditioning and the compressor 52 for cleaning are dispersed to the frame 14, and these vibrations being transmitted to the vehicle body 12 side can be suppressed. Accordingly, in the present embodiment, vibrations, which are caused by plural compressors, being transmitted to passengers who are riding in the vehicle body 12 can be suppressed.

In addition, in the present embodiment, the compressor 50 for air conditioning is mounted to the third cross portion 22 via the first mounting portion 70 that has the rubber bushes 68, and relative vibrations between the compressor 50 for air conditioning and the third cross portion 22 are damped by the rubber bushes 68. Further, the compressor 52 for cleaning is mounted to the third cross portion 22 via the second mounting portion 92 that has the rubber bushes 68, and relative vibrations between the compressor 52 for cleaning and the third cross portion 22 are damped by the rubber bushes 68. Accordingly, in the present embodiment, vibrations that are generated from plural compressors can be absorbed.

Second Embodiment

Figure 7:
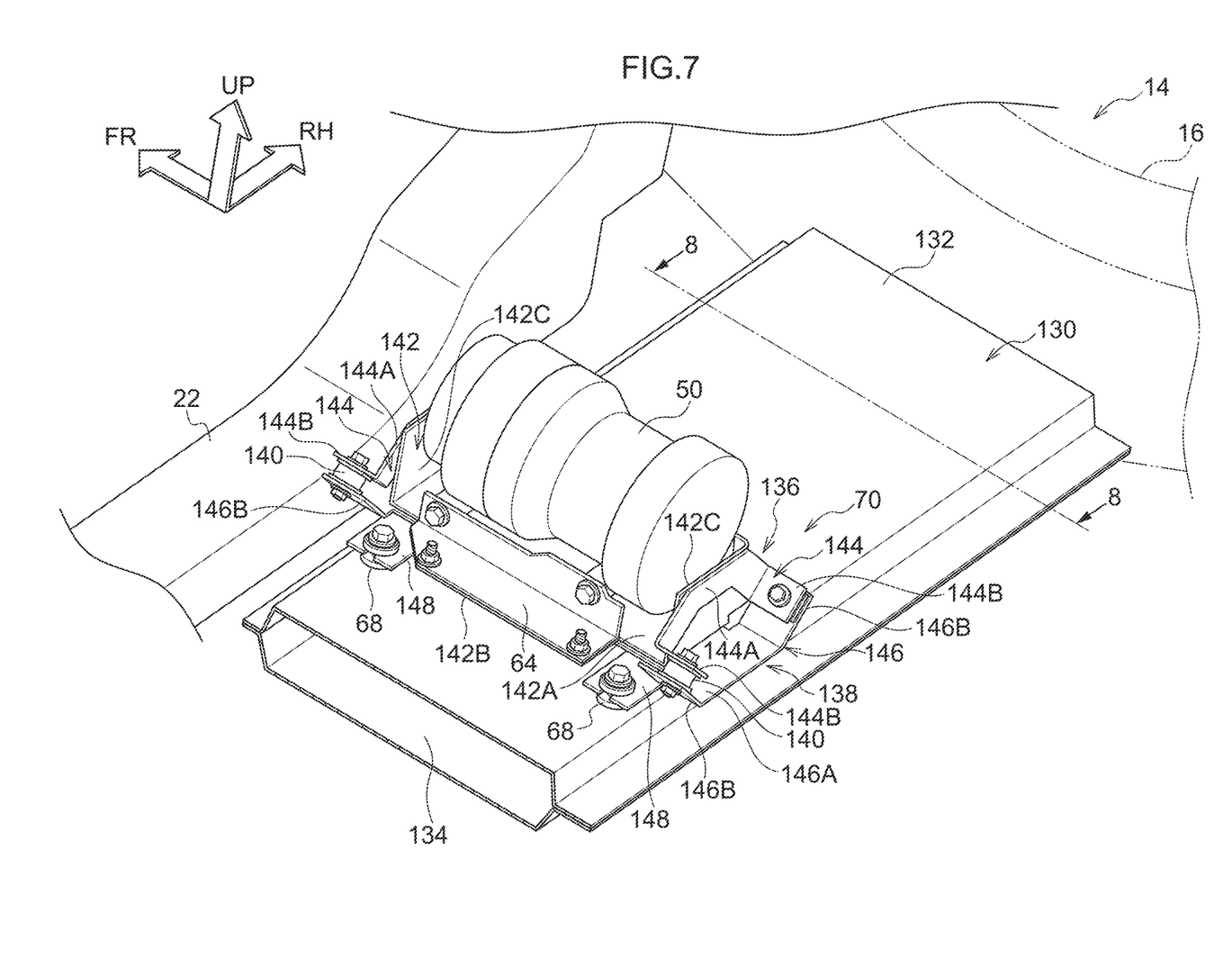
FIG. 7 is a perspective view that schematically shows structures at the periphery of a compressor at the vehicle to which is applied a compressor installation structure for a vehicle relating to a second embodiment.
Figure 8:
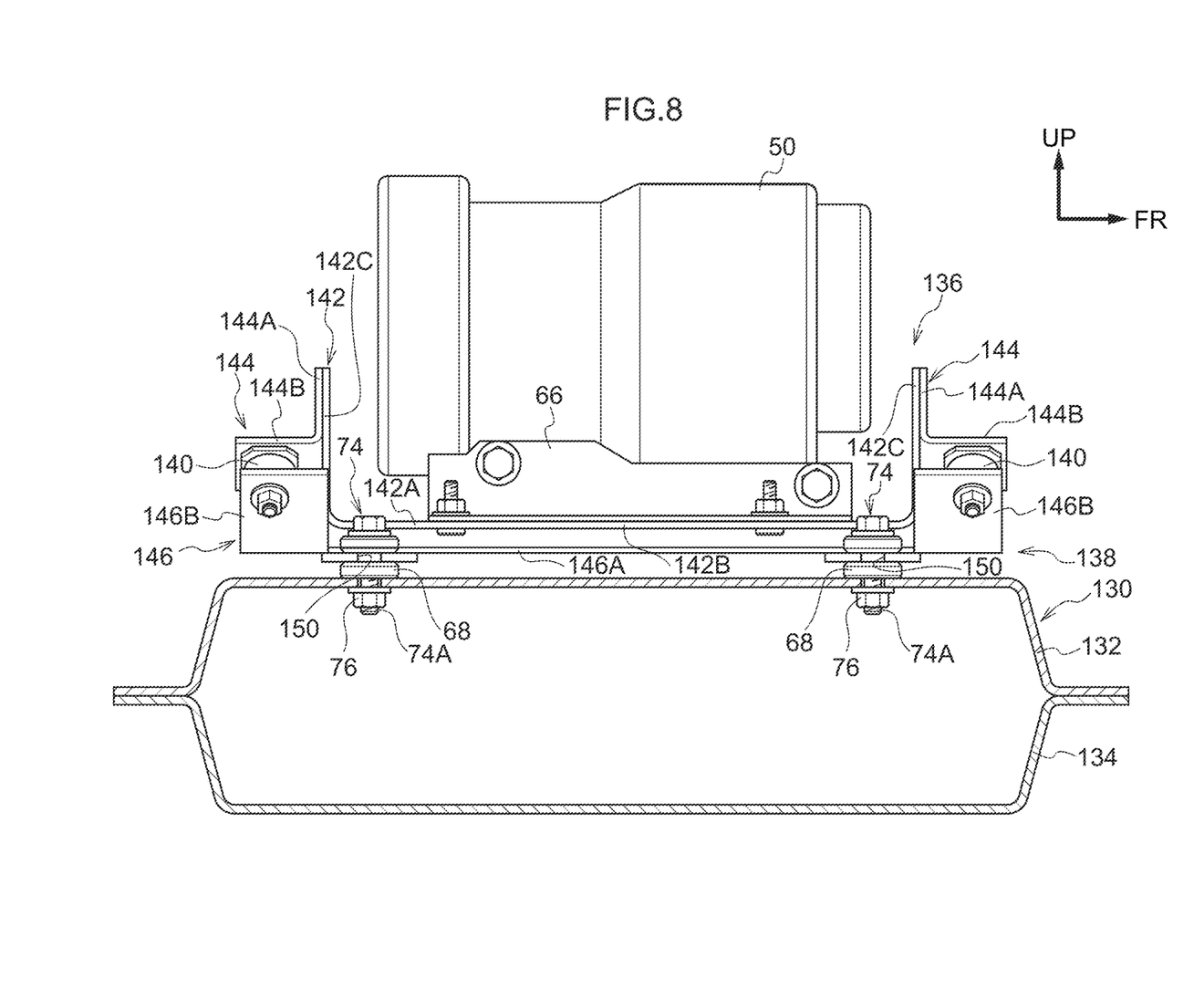
FIG. 8 is a cross-sectional view that is seen from the vehicle width direction and schematically shows structures at the periphery of the compressor at the vehicle to which is applied the compressor installation structure for a vehicle relating to the second embodiment (a cross-sectional view showing the state cut along line 8-8 of FIG. 7).

A compressor installation structure for a vehicle relating to a second embodiment of the present disclosure is described hereinafter by using FIG. 7 and FIG. 8. Note that structural portions that are the same as those of the above-described first embodiment are denoted by the same numbers, and description thereof is omitted.

The present embodiment has a first feature in the point that a "fixed-to portion 130" to which the compressor 50 for air conditioning and the compressor 52 for cleaning are mounted is provided at the frame 14. Further, the present embodiment has a second feature in the point that the first mounting portion 70 and the second mounting portion 92 are structured so as to be able to absorb vibrations in the vehicle width direction that are caused by the compressor 50 for air conditioning and the compressor 52 for cleaning. Note that, in the present embodiment as well, the first mounting portion 70 and the second mounting portion 92 have structures that are basically similar, and therefore, explanation will be given by using the structure of the first mounting portion 70 as an example.

The fixed-to portion 130 is structured due to an upper plate 132 that structures the vehicle upper side portion of the fixed-to portion 130, and a lower plate 134 that structures the vehicle lower side portion of the fixed-to portion 130, being joined at unillustrated joined portions by welding or the like. This fixed-to portion 130 extends in the vehicle width direction, and is a closed cross-sectional structure whose cross-section, as seen from the vehicle width direction, is a closed cross-section.

The fixed-to portion 130 is disposed at the vehicle rear side of the third cross portion 22. The both end portions of the fixed-to portion 130 are fixed by unillustrated joined portions, which are formed by welding or the like, or by fixing members to the vehicle width direction inner side surfaces of the side frame portions 16, respectively.

On the other hand, in the present embodiment, the first mounting portion 70 has an upper side supporting portion 136, a lower side supporting portion 138 and rubber bushes 140, in addition to the supporting member 64, the supporting member 66 and the rubber bushes 68.

The upper side supporting portion 136 is structured to include a base plate portion 142 and a pair of supporting plate portions 144. The base plate portion 142 is disposed at the vehicle lower side of the compressor 50 for air conditioning, and has a lower plate portion 142A that is shaped as a plate whose plate thickness direction is the vehicle vertical direction. A pair of extending portions 142B, which extend-out in the vehicle width direction from the lower plate portion 142A, are provided at the vehicle front-rear direction central portion of the lower plate portion 142A. Further, the supporting member 64 is mounted to the extending portion 142B that is at the vehicle width direction left side, and the supporting member 66 is mounted to the extending portion 142B that is at the vehicle width direction right side.

Vertical plate portions 142C, whose plate thickness directions are the vehicle front-rear direction respectively, extend-out from the lower plate portion 142A toward the vehicle upper side from the peripheral edge portions that are at the vehicle front-rear direction both sides of the lower plate portion 142A. The supporting plate portions 144 are mounted to these vertical plate portions 142C, respectively. Note that the compressor 50 for air conditioning is positioned between the vertical plate portions 142C as seen from the vehicle vertical direction.

The supporting plate portion 144 is structured to include a main plate portion 144A that structures the main portion of the supporting plate portion 144, and a pair of mounting plate portions 144B. The main plate portion 144A is formed in the shape of a U-shaped plate whose plate thickness direction is the vehicle front-rear direction and whose width becomes wider toward the vehicle lower side as seen from the vehicle front-rear direction.

On the other hand, the mounting plate portions 144B are the shapes of plates that extend-out toward the side opposite the compressor 50 for air conditioning, from the end portions at the vehicle width direction both sides of the main plate portion 144A, respectively. The plate thickness directions of the mounting plate portions 144B are set to be directions that are inclined with respect to the vehicle vertical direction and the vehicle width direction. When the pair of mounting plate portions 144B are viewed from the vehicle front-rear direction, the gap between the pair of mounting plate portions 144B becomes more narrow while heading toward the vehicle lower side. Note that the supporting plate portion 144 is mounted to the base plate portion 142 by unillustrated joined portions that are formed by welding or the like.

The lower side supporting portion 138 is structured to include a base plate portion 146 and a pair of fixed plate portions 148. The base plate portion 146 is disposed at the vehicle lower side of the base plate portion 142. The base plate portion 146 has a lower plate portion 146A that is shaped as a plate whose plate thickness direction is the vehicle vertical direction.

Further, mounting plate portions 146B respectively extend-out from the vehicle front-rear direction both side peripheral edge portions at the vehicle front-rear direction both end portions of the lower plate portion 146A. These mounting plate portions 146B are positioned at the vehicle lower sides of the mounting plate portions 144B, and the plate thickness directions thereof are set to be directions that are the same as the plate thickness directions of the mounting plate portions 144B.

The rubber bushes 140 are disposed between the mounting plate portions 146B and the mounting plate portions 144B, in states in which the axial directions thereof are set to the same directions as the plate thickness directions of the mounting plate portions 144B. Note that the intersection point between the axis of the rubber bush 140 that is disposed at the vehicle width direction left side and the axis of the rubber bush 140 that is disposed at the vehicle width direction right side as seen from the vehicle front-rear direction, coincides with the first shaft 62.

The fixed plate portions 148 are shaped as rectangular plates whose plate thickness directions are the vehicle vertical direction and that extend in the vehicle width direction. At the vehicle lower side of the base plate portion 146, the fixed plate portions 148 are disposed adjacent to the mounting plate portions 146B at the compressor 50 for air conditioning side of the mounting plate portions 146B as seen from the vehicle vertical direction, and are mounted to the base plate portion 146 by unillustrated joined portions that are formed by welding or the like.

Slit portions 150 whose one side is open are formed in the both end portions of the fixed plate portion 148 along the vehicle width direction. The rubber bushes 68 are fit-together with the slit portions 150, respectively. The shaft portions 74A of the bolts 74 are inserted through the rubber bushes 68 from the vehicle upper side, and the shaft portions 74A are fastened to the weld nuts 76 that are provided at the lower surface of the upper plate 132. Due thereto, the first mounting portion 70 is fixed to the fixed-to portion 130.

Because such a structure is a structure that is basically similar to the above-described first embodiment, operation and effects that are similar to those of the first embodiment are achieved.

In addition, in the present embodiment, because the rubber bushes 140 are disposed with gaps between the rubber bushes 140 and the compressor 50 for air conditioning in the vehicle width direction, vibrations in the vehicle width direction, which are generated from the compressor 50 for air conditioning, can be absorbed by these rubber bushes 140. Note that, in the present embodiment, the second mounting portion 92 also has the plural rubber bushes 140, and vibrations in the vehicle width direction, which are generated from the compressor 52 for cleaning, can be absorbed by these rubber bushes 140.

Supplementary Description of the Above Embodiments (1) In the above-described embodiments, the compressor installation structure for a vehicle relating to the embodiment is applied to a portion that is at the vehicle front side of the vehicle 10. However, depending on the specifications of the vehicle 10 and the like, the compressor installation structure for a vehicle may be applied to a vehicle rear side portion of the vehicle 10.

(2) Further, in the above-described embodiment, the first mounting portion 70 and the second mounting portion 92 are structured to include the rubber bushes 68, but the present disclosure is not limited to this. Namely, depending on the specifications of the vehicle 10 and the like, the first mounting portion 70 and the second mounting portion 92 may be structured so as to not include the rubber bushes 68.

(3) In addition, in the above-described embodiment, one of each of the compressor 50 for air conditioning and the compressor 52 for cleaning are provided, but the present disclosure is not limited to this. Namely, depending on the specifications of the vehicle 10 and the like, there may be a structure in which plural compressors 50 for air conditioning and compressors 52 for cleaning are disposed at the third cross portion 22 or at the fixed-to portion 130. Further, the vehicle 10 may be provided with at least one of the compressor 50 for air conditioning and the compressor 52 for cleaning, or may be provided with a compressor that has a different application than these. Further, in the case of employing such a structure, when the plural compressors are driven, the driving of the plural compressors is controlled by the control device 94 such that the positions of the centroids of the set of the plural compressors are uniform.

(4) Although the respective compressors are scroll compressors in the above-described embodiments, the present disclosure is not limited to this. Namely, provided that the compressors that are fixed to the same member are the same type of compressor, compressors that utilize various methods can be employed, depending on the specifications of the vehicle 10 and the like.

What is claimed is:

1. A compressor installation structure for a vehicle, the compressor installation structure comprising:
   a first compressor that is installed in the vehicle and that is driven by a first displacement body repeating a first movement at a predetermined cycle; and
   a second compressor that is installed in the vehicle and that is driven by a second displacement body repeating a second movement at the predetermined cycle,
   wherein, in a state in which the first compressor and the second compressor are installed in the vehicle, a first displacement direction of a first centroid of the first displacement body at a time at which the first displacement body performs the first movement is an opposite direction from a second displacement direction of a second centroid of the second displacement body at a time at which the second displacement body performs the second movement,
   the first compressor and the second compressor are fixed to a same fixing portion, and the fixing portion structures a portion of a frame of the vehicle,
   the first displacement body is rotatable around a first shaft,
   the second displacement body is rotatable around a second shaft having a same height in a vehicle vertical direction as the first shaft and extending parallel to the first shaft,
   the fixing portion extends in a vehicle width direction, and
   the first compressor and the second compressor are disposed at an interval in the vehicle width direction.

2. The compressor installation structure of claim 1, wherein the fixing portion is a cross portion that extends between a pair of side frame portions that structure portions of the frame, which supports a vehicle body from a vehicle lower side, that are disposed at an interval in the vehicle width direction, and that extend in a vehicle front-rear direction.

3. The compressor installation structure of claim 1, wherein:
   the first compressor is mounted at the fixing portion via a first mounting portion that has a first damping portion that is configured to damp relative vibration between the first compressor and the fixing portion, and
   the second compressor is mounted to the fixing portion via a second mounting portion that has a second damping portion that is configured to damp relative vibration between the second compressor and the fixing portion.

4. The compressor installation structure of claim 1, wherein the first movement and the second movement comprise rotational movement.

* * * * *